(12) United States Patent
Proca et al.

(10) Patent No.: US 7,978,231 B2
(45) Date of Patent: Jul. 12, 2011

(54) METHOD FOR AUTOMATIC EXPOSURE CONTROL WITHIN A VIDEO CAPTURE DEVICE

(75) Inventors: Adrian Proca, Santa Cruz, CA (US); John Louis Warpakowski Furlan, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 424 days.

(21) Appl. No.: 12/267,505

(22) Filed: Nov. 7, 2008

(65) Prior Publication Data

US 2010/0118159 A1 May 13, 2010

(51) Int. Cl.
*H04N 5/235* (2006.01)
*H04N 9/68* (2006.01)
*H04N 5/225* (2006.01)

(52) U.S. Cl. .................. 348/230.1; 348/234; 348/362

(58) Field of Classification Search ............. 348/222.1, 348/229.1, 230.1, 234, 255, 362, 364
See application file for complete search history.

(56) References Cited

U.S. PATENT DOCUMENTS

| | | | | |
|---|---|---|---|---|
| 6,750,906 B1* | 6/2004 | Itani et al. | ................. | 348/229.1 |
| 6,868,179 B2* | 3/2005 | Gruzdev et al. | ............... | 382/167 |
| 7,123,293 B1* | 10/2006 | Uchida et al. | ............... | 348/222.1 |
| 7,251,361 B2* | 7/2007 | Gruzdev et al. | ............... | 382/167 |
| 7,474,847 B2* | 1/2009 | Nikkanen et al. | ............. | 396/213 |
| 7,612,813 B2* | 11/2009 | Hunter | .......................... | 348/297 |
| 7,671,901 B2* | 3/2010 | Masuda et al. | ............. | 348/229.1 |
| 2003/0142829 A1* | 7/2003 | Avigni | ............................ | 381/26 |
| 2004/0183924 A1* | 9/2004 | Hannah | ...................... | 348/229.1 |
| 2005/0270427 A1* | 12/2005 | Kim et al. | ...................... | 348/652 |
| 2008/0291293 A1* | 11/2008 | Kawamura | .................. | 348/229.1 |
| 2009/0322901 A1* | 12/2009 | Subbotin et al. | ............ | 348/229.1 |
| 2010/0045820 A1* | 2/2010 | Prieto et al. | ................. | 348/229.1 |
| 2010/0118204 A1* | 5/2010 | Proca et al. | ................... | 348/671 |
| 2010/0309332 A1* | 12/2010 | Ueda et al. | ................. | 348/229.1 |
| 2010/0328491 A1* | 12/2010 | Ovsiannikov | .............. | 348/229.1 |

FOREIGN PATENT DOCUMENTS

JP 2004349837 A * 12/2004

\* cited by examiner

*Primary Examiner* — John M Villecco
(74) *Attorney, Agent, or Firm* — Patterson & Sheridan, LLP

(57) ABSTRACT

On embodiment of the present invention sets forth a technique for automatically computing exposure parameters for a digital video camera (DVC) system. The exposure parameters include exposure gain, analog gain, and digital gain. Each frame is analyzed with respect to an image luma value. Exposure gain and analog gain are adjusted to reduce differences between a target image luma value and measured image luma values over sequential frames. Digital gain is adjusted with respect to each frame to reduce visually abrupt changes in sequentially captured video frames.

12 Claims, 8 Drawing Sheets

METHOD FOR AUTOMATIC EXPOSURE CONTROL WITHIN A VIDEO CAPTURE DEVICE

BACKGROUND OF THE INVENTION

1. Field of the Invention

The present invention relates generally to video capture devices and, more specifically, to a method for automatic exposure control within a video capture device.

2. Description of the Related Art

Digital video camera (DVC) technology has developed rapidly over the past decade. A broad variety of DVCs are now available to meet the diverse needs of a wide spectrum of consumers. DVC technology provides a user with a convenient device that records video and audio and also provides the ability to transfer the recorded video and audio to a computer-readable medium. The computer-readable medium may be, for example, a Digital Video Disc (DVD) or a computer memory.

A DVC typically includes an optical lens assembly configured to focus images from an illuminated environment onto an active region of an image sensor. Because illumination for a given environment may vary significantly, the DVC must be able to adjust to prevailing illumination conditions while still capturing a sequence of properly exposed video frames that comprise a video sequence. A properly exposed frame should reveal the subject or region of interest somewhere in the middle of the dynamic range of the sensor. Exposure gain, which is proportional to exposure time, and analog gain (image sensor gain) are two parameters that conventionally determine how a given video frame is sampled by the DVC. A longer exposure time and higher analog gain may be used in low light settings, while a shorter exposure time and lower analog gain may be used in well-illuminated settings. As sequential frames are captured by the DVC, these two parameters are typically adjusted by the DVC to maintain a sequence of properly exposed video frames.

A DVC user typically records video in uncontrolled environments that include sources of bright light and regions that are relatively dark. For example, a typical apartment room with daylight entering through an unobstructed window may include very bright visual regions around the window and where sunlight strikes objects within the room, and relatively dark visual regions away from the sunlight. When the DVC user pans from a bright visual region to a dark visual region, the DVC employs an automatic exposure means to automatically adjust the exposure gain and analog gain to compensate for the highly variable and quickly changing illumination presented to the image sensor.

In conventional DVC systems, exposure gain and analog gain are discrete, quantized values which are selected to attempt to yield proper exposure for a given image (video frame). When a user pans between light and dark visual regions, quantization granularity of the exposure gain and analog gain can yield a sequence of video frames that appears to become abruptly lighter or darker as the camera adapts to changing lighting conditions. Abrupt changes to image brightness do not typically appear natural and degrade overall video sequence quality. Instead, perceived image brightness should change smoothly as the DVC pans from light to dark visual regions.

One solution for reducing abrupt changes in image brightness involves including a mechanical iris assembly within the optical path of the optical lens assembly. The iris assembly provides certain DVC systems with a primary illumination adjustment parameter that can be used to maintain more constant image brightness over a sequence of images and therefore mitigate abrupt changes to perceived scene brightness. However, an iris assembly can be quite expensive and therefore does not represent an effective solution for many types of DVC systems.

Accordingly, there remains a need in the art for an effective automatic exposure technique that reduces abrupt changes in image brightness within digital video camera systems.

SUMMARY OF THE INVENTION

One embodiment of the present invention sets forth a method for determining a system gain in a digital video recorder to control changes in recorded image intensity. The method includes the steps of computing a luma value for a current video frame based on an average luma value for the current video frame and an offset related to a number of overexposed pixels in the current video frame, computing a luma correction value corresponding to a difference between the luma value for the current video frame and a target luma value, determining an adaptation step based on the luma correction value, and computing a system gain associated with the current video frame by adding the adaptation step to a system gain associated with a previous video frame. The method also includes the steps of computing at least one gain parameter based on the system gain associated with the current video frame, and configuring at least one element within the digital video recorder to operate according to the at least one gain parameter.

Another embodiment of the present invention sets forth a method for computing image statistics associated with a current video frame for controlling changes in recorded image intensity. The method includes the steps of computing an average luma value for the current video frame, computing a luma histogram based on luma data associated with the current video frame, determining a number of overexposed pixels associated with the current video frame based on the luma histogram, computing an offset value based on the number of overexposed pixels; and computing a final luma value for the current video frame based on the average luma value for the current video frame and the offset value. The final luma value is used in determining a system gain in a digital video recorder to control the changes in the recorded image intensity.

Other embodiments of the present invention include computer-readable media and systems configured to implement at least all or part of the above methods.

One advantage of the disclosed methods is that they enable a digital video camera to better control transitions between high and low environmental illumination, thereby producing higher quality video images, without having to implement a mechanical iris assembly.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
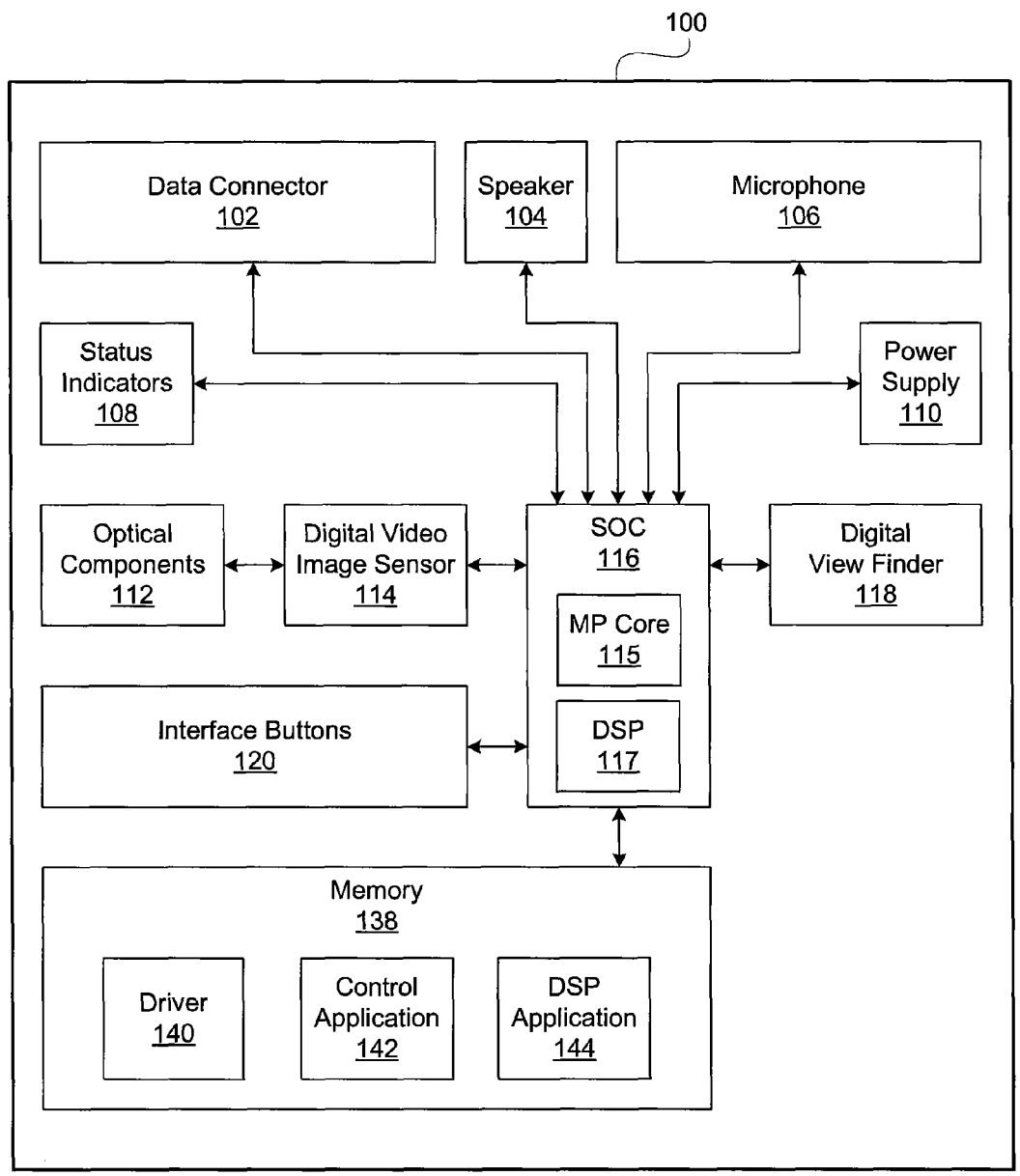
FIG. 1 is a block diagram of a digital video system configured to implement one or more aspects of the invention.

FIG. 1 is a block diagram of a hand-held device (HHD) 100 configured to implement one or more aspects of the invention. As shown, the HHD 100 includes, without limitation, a data connector 102, a speaker 104, a microphone 106, status indicators 108, a power supply 110, optical components 112, a digital video image sensor 114, a system on a chip (SOC) 116, a digital viewfinder 118, interface buttons 120, and an internal memory 138.

The data connector 102 is an integrated mechanism that allows the HHD 100 to be connected with a separate TV or computer system, such as laptop or a desktop computer, and to transfer data to and from the TV and/or computer system. The data connector 102 may be a universal serial bus (USB) connector, a firewire connector, a serial connector, or another type of connector that is capable of connecting the HHD 100 with the TV or the computer system.

The status indicators 108 visually indicate the current mode of operation of the HHD 100. The status indicators 108 include light emitting diodes (LEDs) that can be "ON," blinking, or "OFF," depending on the current operating mode of the HHD 100. The operating modes of the HHD 100 include, among others, a record mode and a playback mode. When in the record mode, the HHD 100 is configured to capture video and audio of a particular scene through the optical components 112 and the microphone 106, respectively. When in the playback mode, the HHD 100 is configured to play previously-captured digital videos that are stored in the internal memory 138. In one embodiment, the digital videos may be displayed on the digital viewfinder 118, and the audio may be output through the speaker 104. In alternative embodiments, the digital video and audio may be output to the TV or to the computer system for playback.

The power supply 110 provides power to the HHD 100. The power may be provided by a battery or an external power source (e.g., an AC outlet). The optical components 112, which may include one or more lenses, capture the scene and project an image of the scene onto the digital video image sensor 114. The optical components 112 are capable of capturing a sequence of images over a period of time (e.g., 30 images/frames per second). The digital video image sensor 114 converts the captured image into digital video data and then transmits the digital video data to the SOC 116 for further processing.

The microphone 106, similarly, captures the sound in the scene and converts the captured sound to digital audio data. The microphone 106 then transmits the digital audio data to the SOC 116 for further processing.

The SOC 116 communicates with the various components within the HHD 100 to control the operations of the HHD 100. The SOC 116 also processes inputs from the interface buttons 120. For example, when the HHD 100 is in record mode, the SOC 116 transmits the digital video data received from the digital video image sensor 114 to the digital viewfinder 118 for display. In one embodiment, the SOC 116 combines the digital audio data received from the microphone 106 and the digital video data received from the digital video image sensor 114 to create a composite video file. The composite video file may then be transmitted to the internal memory 138 for storage. When the HHD 100 is in playback mode, the SOC 116 retrieves the composite video file from the internal memory 138 and transmits the video portion of the composite video file to the digital viewfinder 118 and the audio portion of the composite video file to the speakers 104. In alternative embodiments, the digital audio data received from the microphone 106 and the digital video data received from the digital video image sensor 114 may be stored separately in the internal memory 138.

The SOC 116 includes a digital signal processor (DSP) means 117, such as logic optimized to efficiently perform digital signal processing tasks, including mathematically intensive computations. In one embodiment the DSP means 117 comprises a co-processor configured to execute instructions independently from a microprocessor (MP) core 115. The MP core 115 may be configured to execute a control application 142 disposed in memory 138 and the DSP means 117 may be configured to execute a DSP application 144, also disposed in memory 138. Persons skilled in the art will recognize that the control application 142, driver 140, and DSP application 144 may be loaded into the SOC 116 for execution. In one embodiment, the DSP application 144 may reside in embedded memory within the SOC 116.

The digital viewfinder 118 displays previously-captured composite video files and also displays an image of the scene being captured while the composite video file is being recorded. The digital viewfinder 118 is preferably a liquid crystal display (LCD).

The interface buttons 120 may include physical buttons, such as a power button and a record button (not shown). The power button is configured to turn the HHD 100 on and off. The record button, when selected, begins and ends the recording of video and audio of a particular scene. Other interface buttons (not shown) may include, without limitation, a left button, a right button, an increase button, a decrease button, a play button, and a delete button, wherein each may be implemented as capacitive-touch buttons. The left button and the right button may be used to scroll through composite video files stored in the internal memory 138. The increase button and the decrease button may provide various functions depending on the current operating mode of the HHD 100. For example, when the HHD 100 is in playback mode, the increase button may be used to increase the audio volume. In other modes, the increase button may be used to increase the magnification of an image being captured or viewed on the digital viewfinder 118. Similarly, the decrease button may be used to decrease the audio volume in playback mode.

The internal memory 138 stores the composite video files recorded by the user as well as firmware that is executed by the SOC 116 to control the operations of the HHD 100. The internal memory 138 comprises either volatile memory, such as dynamic random access memory (DRAM), or non-volatile memory, such as a hard disk or a flash memory module, or a combination of both volatile and non-volatile memory. The internal memory 138 also stores a software driver 140 implemented as a set of program instructions configured to coordinate operation between the interface buttons 120 and the other components of the HHD 100. For example, the program instructions that constitute the driver 140 may be executed by the SOC 116 to cause different capacitive-touch buttons to be illuminated when the HHD 100 is in different operating modes.

Figure 2:
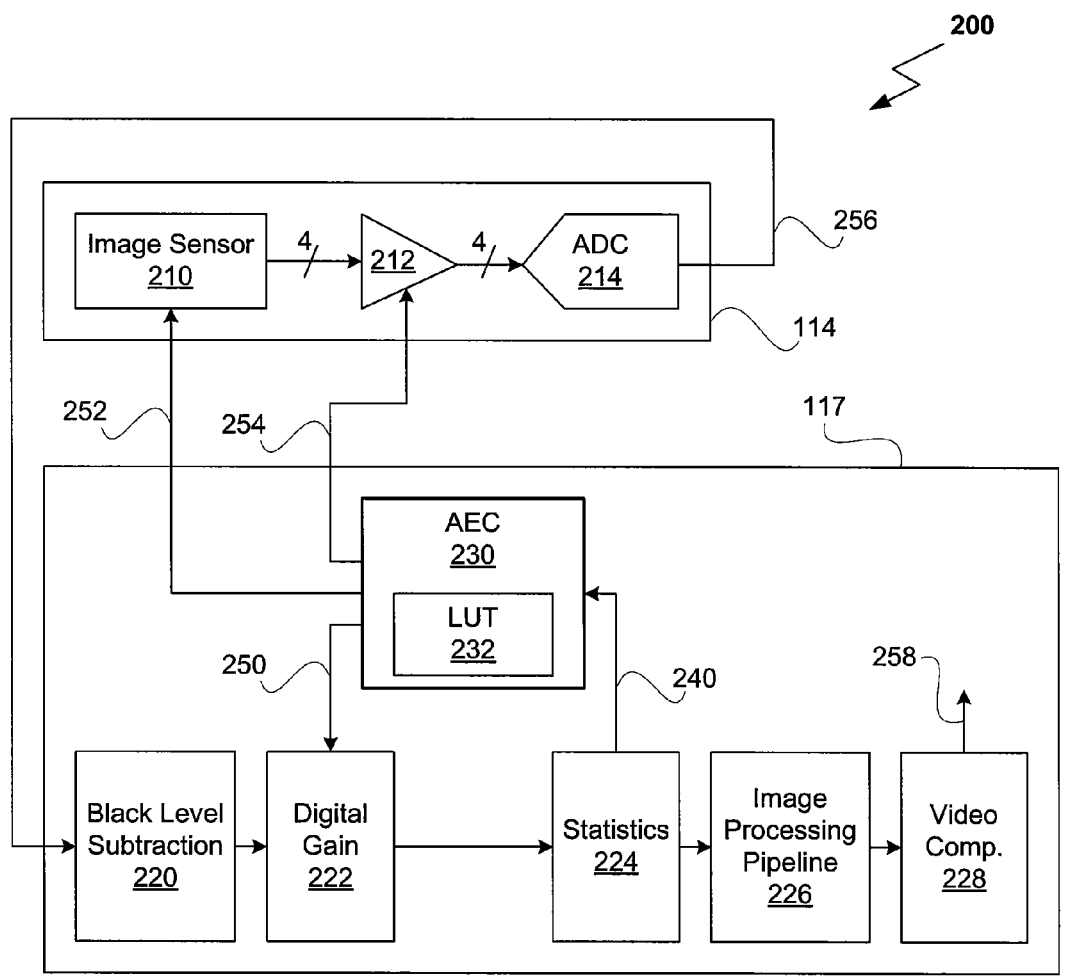
FIG. 2 is a block diagram of a digital signal processing system for computing exposure gain, analog gain, and digital gain, according to one embodiment of the invention.

FIG. 2 is a block diagram of a digital signal processing system 200 for computing exposure gain, analog gain, and digital gain, according to one embodiment of the invention. The digital signal processing system 200 includes the digital video image sensor 114 and the DSP means 117 of FIG. 1. The digital video image sensor 114 receives optical images and generates a corresponding stream of raw video data 256, which represents a digital sampling of the optical images. The stream of raw video data 256 is transmitted to the DSP means 117 for processing. The DSP means 117 processes the stream of raw video data 256 to generate a compressed video stream 258, which may be stored within the memory 138.

The digital video image sensor 114 comprises an image sensor 210, a set of amplifiers 212, and at least one analog to digital converter (ADC) 214. The image sensor 210 samples a two-dimensional optical image that is focused onto the image sensor 210 by the optical components 112. The image sensor converts the two-dimensional (2D) optical image into a 2D array of electrical sample clusters that represent the 2D optical image. Each electrical sample cluster includes at least one intensity value for red, blue, and green light. In one embodiment, each electrical sample cluster includes one red, one blue, and two green intensity values. Each intensity value is represented by an analog electrical value, such as a voltage. Each electrical sample cluster from the 2D array of electrical sample clusters is sequentially transmitted to the set of amplifiers 212 via electrical channels configured to transmit a specific color sample within the electrical sample cluster. In one embodiment, four channels are used to transmit one red channel, two green channels, and one blue channel per electrical sample cluster.

The set of amplifiers 212 applies electrical gain to each channel within the electrical sample cluster to generate an amplified electrical sample cluster. The amplified electrical sample cluster is transmitted to the ADC 214, which converts each analog electrical value for each channel to an associated digital value. The digital values generated by the ADC 214 comprise the stream of raw video data 256, which transmits sampled images from the image sensor 210.

The four intensity values within each electrical sample cluster may be interpolated to generate a pixel, wherein each pixel may comprise one red intensity value, one green intensity value, and one blue intensity value. Collectively, the electrical sample clusters from the image sensor 210 may be interpolated to generate a 2D array of pixels. Each 2D array of pixels comprises a frame of video data, or simply "video frame."

One characterization of a pixel brightness value is known in the art as a luma value, represented as a weighted sum of the red, green, and blue intensity values of the pixel. The luma value ("Y") of a pixel is approximately given by Y=(0.6*green_intensity)+(0.3*red_intensity)+(0.1*blue_intensity). Furthermore, an entire image may be characterized as having an overall luma value, whereby a function may be applied to the pixels within the image to generate an image luma value that characterizes the brightness of the image. One function that may be used to generate an image luma value is an arithmetic average performed over the luma values of individual pixels within the image. Persons skilled in the art will recognize that other functions may also be used to determine an image luma value for a given image.

The image sensor 210 is configured to accept an exposure gain parameter 252, which determines a sampling duration applied to each electrical sample cluster when converting the 2D optical image to the 2D array of electrical sample clusters. The longer the sampling duration, the more charge may accumulate relative to an electrical sample cluster, and the larger the amplitude of each signal within the associated electrical sample cluster. The set of amplifiers 212 is configured to accept an analog gain parameter 254, which determines the amount of analog amplification applied to the electrical sample cluster to generate the amplified electrical sample cluster. The exposure gain parameter 252 and the analog gain parameter 254 should both be represented as digital signals, each with finite resolution.

The DSP means 117 includes a black level subtraction unit 220, a digital gain unit 222, a statistics unit 224, an image processing pipeline 226, a video compression unit 228, and an automatic exposure control (AEC) unit 230. The black level subtraction unit 220 receives the stream of raw video data 256 and subtracts a baseline black level from each intensity value within the stream of raw video data 256 to produce a black level compensated video stream. In one embodiment, each subtraction operation is clamped to a constant, such as zero, so that the result of each subtraction operation results in a value at least as large as the constant. The digital gain unit 222 multiplies each intensity value within the black level compensated video stream by a constant to generate a gain compensated video stream. The gain compensated video stream is transmitted to the statistics unit 224. The statistics unit 224 analyses each video frame from the gain compensated video stream to extract image statistics data 240 from the video frame. The image statistics data 240 includes, without limitation, an image luma value for the video frame and a luma histogram for the video frame. The gain compensated video stream is further transmitted to the image processing pipeline 226 for any additional processing, such as white balance compensation or noise reduction, to generate an uncompressed video stream.

The uncompressed video stream is transmitted to the video compression unit 228, which generates the compressed video stream 258 from the uncompressed video stream. The compressed video stream 258 typically requires less data to represent a given set of video images than the uncompressed video stream. Any technically feasible compression technique may be used to compress the uncompressed video stream.

After each video frame is processed by the statistics unit 224, image statistics data 240 for the frame is transmitted to the AEC unit 230. The AEC unit 230 generates a digital gain parameter 250, which is transmitted to the digital gain unit 222 to establish a digital gain value. The AEC unit 230 also generates the exposure gain parameter 252 and the analog gain parameter 254 for an upcoming video frame. The exposure gain parameter 252 is transmitted to the image sensor 210, while the analog gain parameter 254 is transmitted to the set of amplifiers 212. The AEC unit 230 may incorporate a lookup table (LUT) 232, used to in computing adjustments to output parameters computed by the AEC unit 230. The LUT 232 is described in greater detail below. A system gain value characterizes the combined gain effect of the exposure gain parameter 252, the analog gain parameter 254, and the digital gain parameter 250. In one embodiment, the system gain is a product of the gain due to the exposure gain parameter 252, the analog gain parameter 254, and the digital gain parameter 250.

Figure 3A:
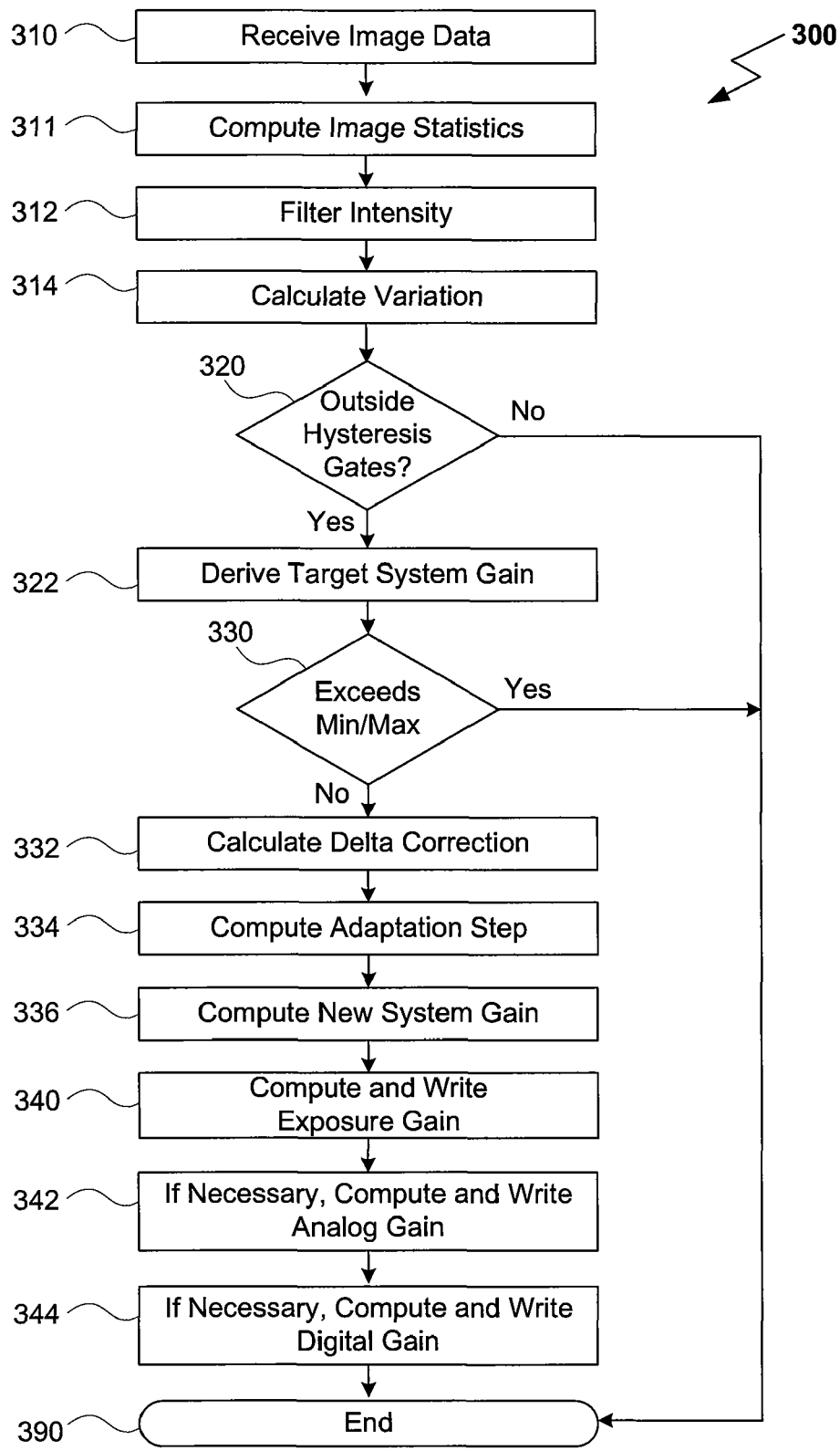
FIG. 3A is a flow diagram of method steps for computing exposure gain, analog gain, and digital gain, according to one embodiment of the invention.

FIG. 3 is a flow diagram of method steps 300 for computing exposure gain, analog gain, and digital gain, according to one embodiment of the invention. Persons skilled in the art will understand that, even though the method is described in conjunction with the systems of FIGS. 1-2, any system configured to perform the method steps, in any order, is within the scope of the present invention. The method is executed once for each video frame in a sequence of video frames.

The method begins in step 310, where the AEC unit 230 receives image data, such as a two-dimensional array of pixels. In step 311, the statistics unit 224 computes image statistics, including an image luma value for a current video frame and a luma histogram for the video frame. In step 312, the image luma value is filtered according to conventional filtering techniques, such as a finite impulse response (FIR) filter, characterized by a number of taps. In one embodiment the FIR filter includes five taps.

In step 314, the AEC unit 230 calculates variation in image luma value for the current video frame versus a target luma value. If, in step 320, the variation in image luma value is outside a set of hysteresis gates, then the method proceeds to step 322. This scenario indicates that a large change in image luma value within the current video frame has occurred and the system needs to adjust for the change in illumination by adjusting the system gain. In step 322 the AEC unit 230 computes the target system gain, which represents a suitable system gain that should produce an image luma value equal to the predefined luma value target. The target system gain should not be used to determine exposure for the current frame, but is instead used to converge the current system gain for proper exposure over a sequence of multiple frames.

If, in step 330, the target system gain does not exceed a preset minimum or maximum value, then the method proceeds to step 332, where the AEC unit 230 calculates a delta correction value. The delta correction value corresponds to a difference between an image luma value for the current video frame and a target luma value. In step 334, the AEC unit 230 computes an adaptation step using the delta correction value as an input into the LUT 232, which generates the adaptation step. The adaptation step defines how much the system gain should change during one frame time in adapting to prevailing lighting conditions. The LUT 232 includes a mapping function from the delta correction value to the adaptation step. In step 336, the AEC unit 230 computes a new system gain for the next video frame by adjusting the current system gain according to the adaptation step read from the LUT 232. If the current luma value is more than the target value, then the adaptation step is added to the current system gain. However, if the current luma value is less than the target value, then the adaptation step is subtracted from the current system gain.

In step 340, the AEC 230 computes a new exposure gain corresponding to a maximum system gain value that does not exceed the new system gain. In one embodiment, the new exposure gain is constrained to a multiple of an established flicker period, such as 1/60 of a second. Persons skilled in the art will recognize that digital video camera systems commonly counteract ambient light flicker by sampling images using an integral product of an ambient flicker frequency. One common flicker frequency is 60 Hz, which is conventionally emitted by fluorescent lights. The new exposure gain is then transmitted to the image sensor 210 as the exposure gain parameter 252. In one embodiment, the new exposure gain takes effect in a video frame subsequent to the current video frame.

In step 342, if necessary, the AEC 230 computes a new analog gain. The new analog gain should be computed according to analog gain quantization steps such that the product of the analog gain by the new exposure gain does not exceed the new system gain. The new analog gain is then transmitted to the set of amplifiers 212 as the analog gain parameter 254. In one embodiment, the new analog gain takes effect in a video frame subsequent to the current video frame.

In step 344, the AEC 230 computes a new digital gain. The new digital gain should be computed according to digital gain quantization steps such that the product of the new digital gain multiplied by the new analog gain and further multiplied by the new exposure gain does not exceed the new system gain. The new digital gain is transmitted to the digital gain unit 222 as digital gain parameter 250. In one embodiment, the new digital gain is applied to a current video frame, thereby providing an effective system gain that yields an intermediate image luma value that may be available between changes to other system gain factors, such as the exposure gain. In this way, each frame may be individually adjusted to provide smoother frame-to-frame transitions during gain adaptation.

Among exposure gain, analog gain, and digital gain, exposure gain introduces the least noise and digital gain introduces the most noise. Therefore, exposure gain should contribute as much overall system gain as feasible. After exposure gain, analog gain should provide the next source of system gain. After analog gain, digital gain should introduce any remaining system gain required to operate within the new system gain and, importantly, smooth any abrupt changes in image luma value for sequential video frames.

Returning to step 320, if the variation in image luma value is not outside the set of hysteresis gates, then the variation in image luma value is too small in the current frame to trigger an adjustment of system gain and the method terminates in step 390.

Returning to step 330, if the new system gain exceeds an established minimum or maximum value, then the prevailing image luma value is outside operable system limits and the method terminates in step 390.

Figure 3B:
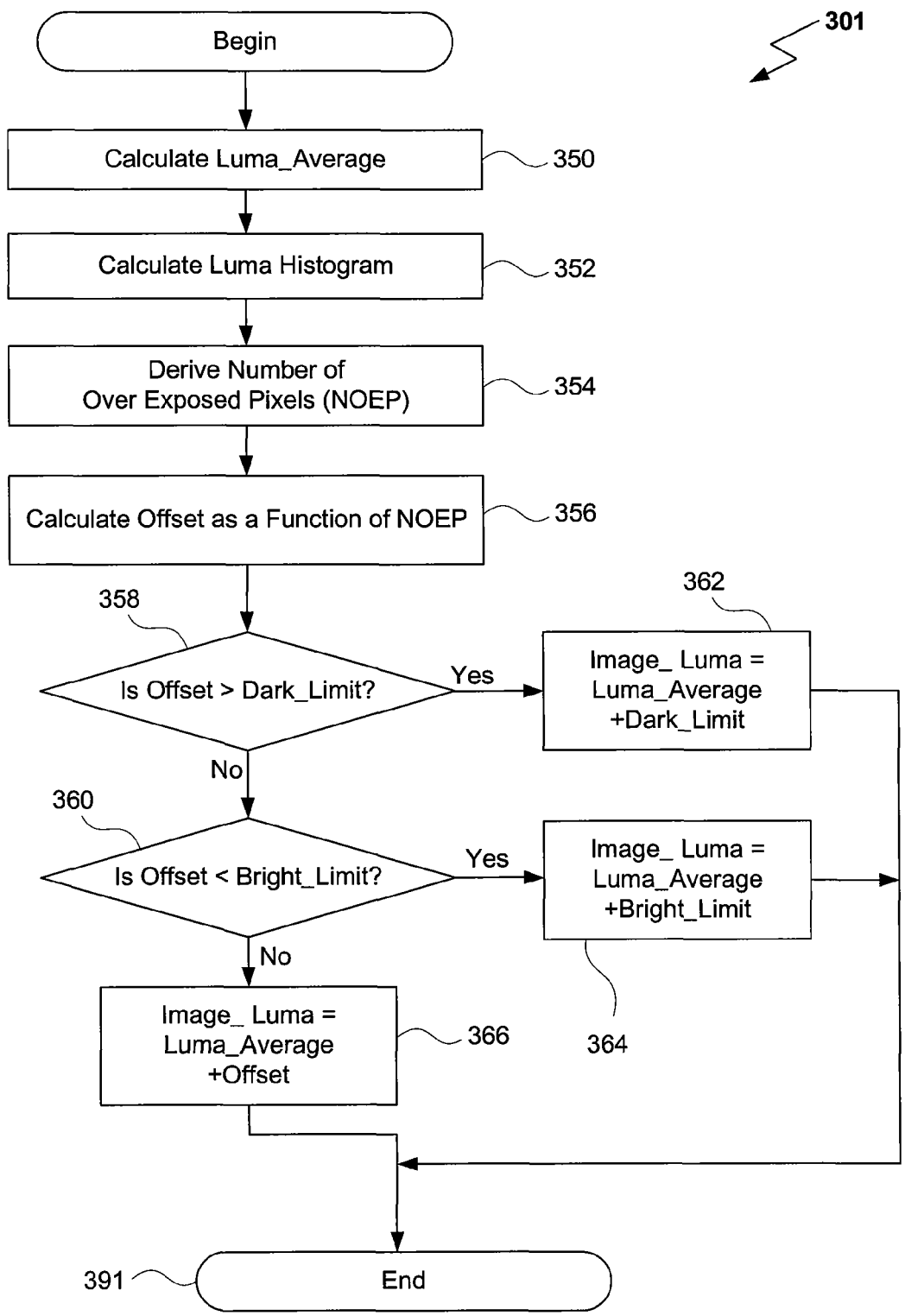
FIG. 3B is a flow diagram of method steps for computing an image luma value, according to one embodiment of the invention.

FIG. 3B is a flow diagram of method steps 301 for computing an image luma value, according to one embodiment of the invention. Persons skilled in the art will understand that, even though the method is described in conjunction with the systems of FIGS. 1-2, any system configured to perform the method steps, in any order, is within the scope of the present invention. This method represents one implementation of method step 311 in FIG. 3A.

The method begins in step 350, where the statistics unit 224 calculates an average luma value for pixels in a current video frame. Persons skilled in the art will understand that various functions other than a strict average function may also be used to generate an average luma value in this step. In step 352, a luma histogram is calculated for the pixels in the current video frame. A luma histogram represents occurrence frequency of luma values for the video frame. For example, a luma histogram may be represented as a two-dimensional plot, where a horizontal axis corresponds to a pixel luma value, and a vertical axis corresponds to a number of pixels with the pixel luma value (occurrence frequency). In step 354, the statistics unit 224 derives a number of over exposed (saturated white) pixels. The statistics unit should also calculate a number of under exposed (saturated black) pixels. In step 356, the statistics unit 224 computes an offset, based on the number of over exposed pixels. The offset acts to compensate for overexposed pixels, which may not contribute sufficiently to a strict average image luma value used to adjusting gain.

If, in step 358, the offset is larger than a dark limit, then the method proceeds to step 362, where the statistics unit 224 calculates an image luma value for the current video frame as the sum of the average luma value added to the dark limit. The dark limit represents a number of under exposed pixels calculated in step 354. The method terminates in step 391.

Returning to step 358, if the offset is not larger than the dark limit, then the method proceeds to step 360. If, in step 360, the offset is less than a bright limit, then the method proceeds to step 364, where the statistics unit 224 calculates an image luma value for the current video frame as the sum of the average luma value added to the bright limit, which may be a negative value.

Returning to step 360, if the offset is not less then the bright limit, then the method proceeds to step 366, where the statistics unit 224 calculates an image luma value for the current video frame as the sum of the average luma value added to the offset value. In effect, an applied offset is added to an image luma value, such as an average image luma value, whereby the applied offset is bounded by a maximum positive value given by the dark limit and a maximum negative value given by the bright limit.

Figure 3C:
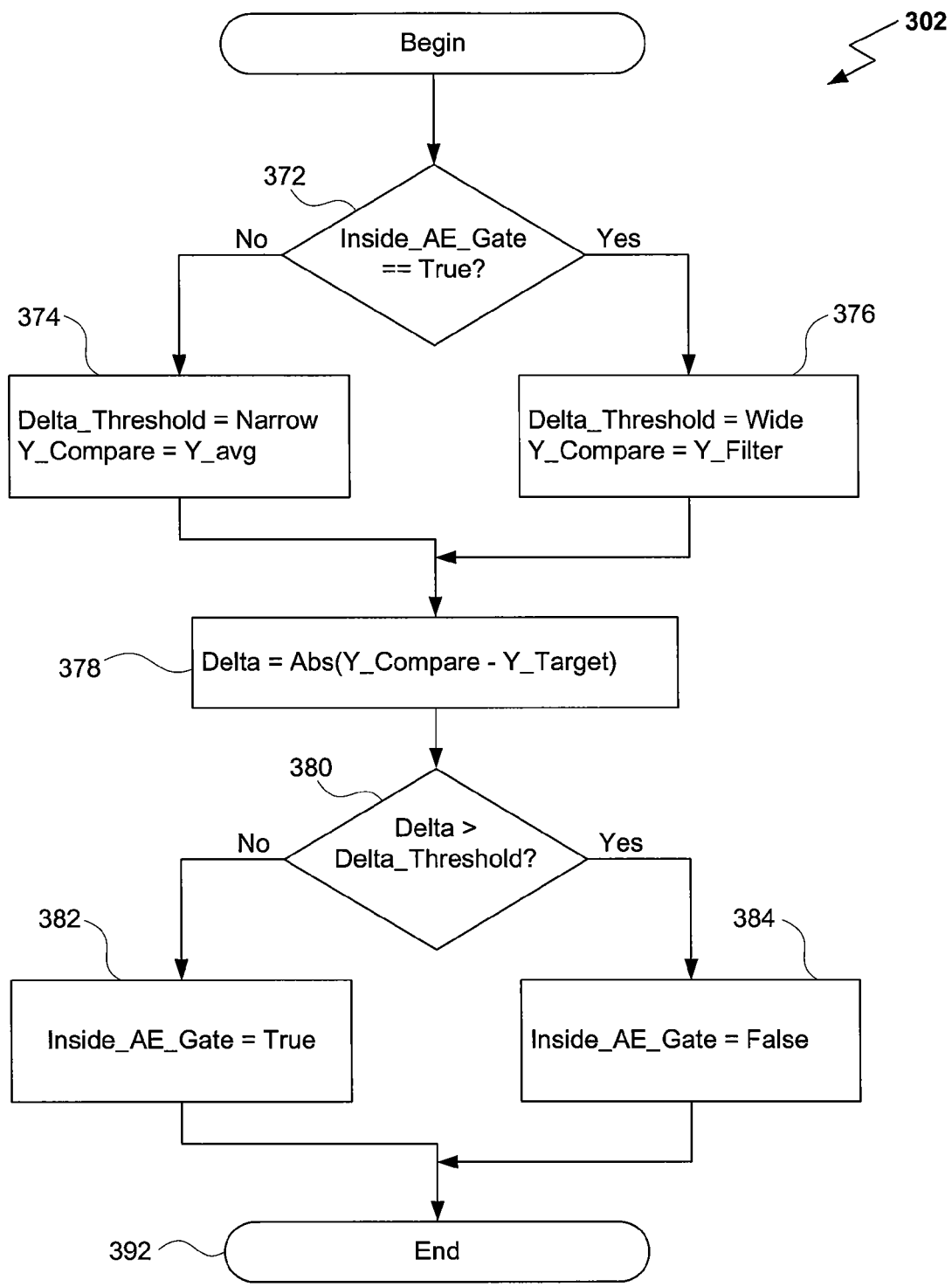
FIG. 3C is a flow diagram of method steps for computing a delta correction value, according to one embodiment of the invention.

FIG. 3C is a flow diagram of method steps for computing a delta correction value, according to one embodiment of the invention. Persons skilled in the art will understand that, even though the method is described in conjunction with the systems of FIGS. 1-2, any system configured to perform the method steps, in any order, is within the scope of the present invention. This method represents one implementation of method step 332 in FIG. 3A.

The method begins in step 372, where a flag (Inside_AE_Gate) is tested. The Inside_AE_Gate flag indicates whether a previous video frame was inside auto exposure gates. If the Inside_AE_Gate flag is true, then the method proceeds to step 376, where a Delta_Threshold value is set to a "wide" range and a Y_Compare variable is set to a filtered Y value, calculated in step 312 of FIG. 3A.

Returning to step 372, if the Inside_AE_Gate is not true, the method proceeds to step 374, where the Delta_Threshold value is set to a "Narrow" range and the Y_Compare variable is set to an average luma value calculated in step 350 of FIG. 3B. In step 378, a delta value is calculated as the absolute value of a difference between the Y_Compare value and a previously calculated target luma value (Y_Target).

If, in step 380, the delta value is larger than a threshold value (Delta_Threshold), then the method proceeds to step 384, where the Inside_AE_Gate flat is set to "false." The method terminates in step 392.

Returning to step 380, if the delta value is not larger than Delta_Threshold, then the method proceeds to step 382, where the Inside_AE_Gate is set to "true."

Figure 4:
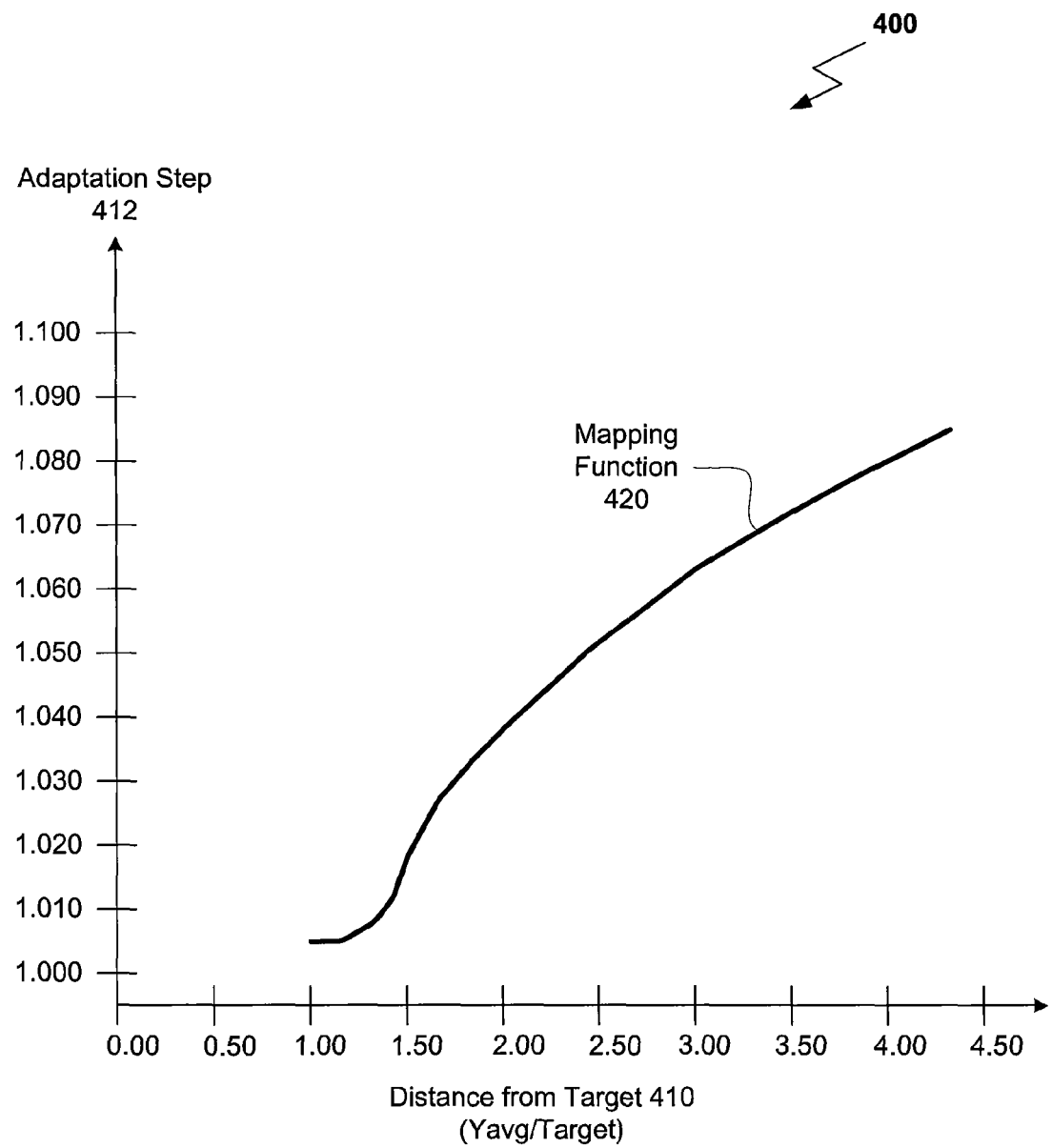
FIG. 4 illustrates an exemplary step adaptation lookup table for computing automatic exposure information, according to one embodiment of the invention.

FIG. 4 illustrates an exemplary step adaptation lookup table 400 for computing automatic exposure information, according to one embodiment of the invention. The step adaptation lookup table 400 maps a distance from target 410 to adaptation step 412 via a mapping function 420. In one embodiment, the distance from target 410 is defined as the quotient of the image luma value for a sample image divided by a specified luma target. Persons skilled in the art will recognize that the mapping function 420 is one example of a mapping function and may be modified without departing the scope of the invention.

Figure 5:
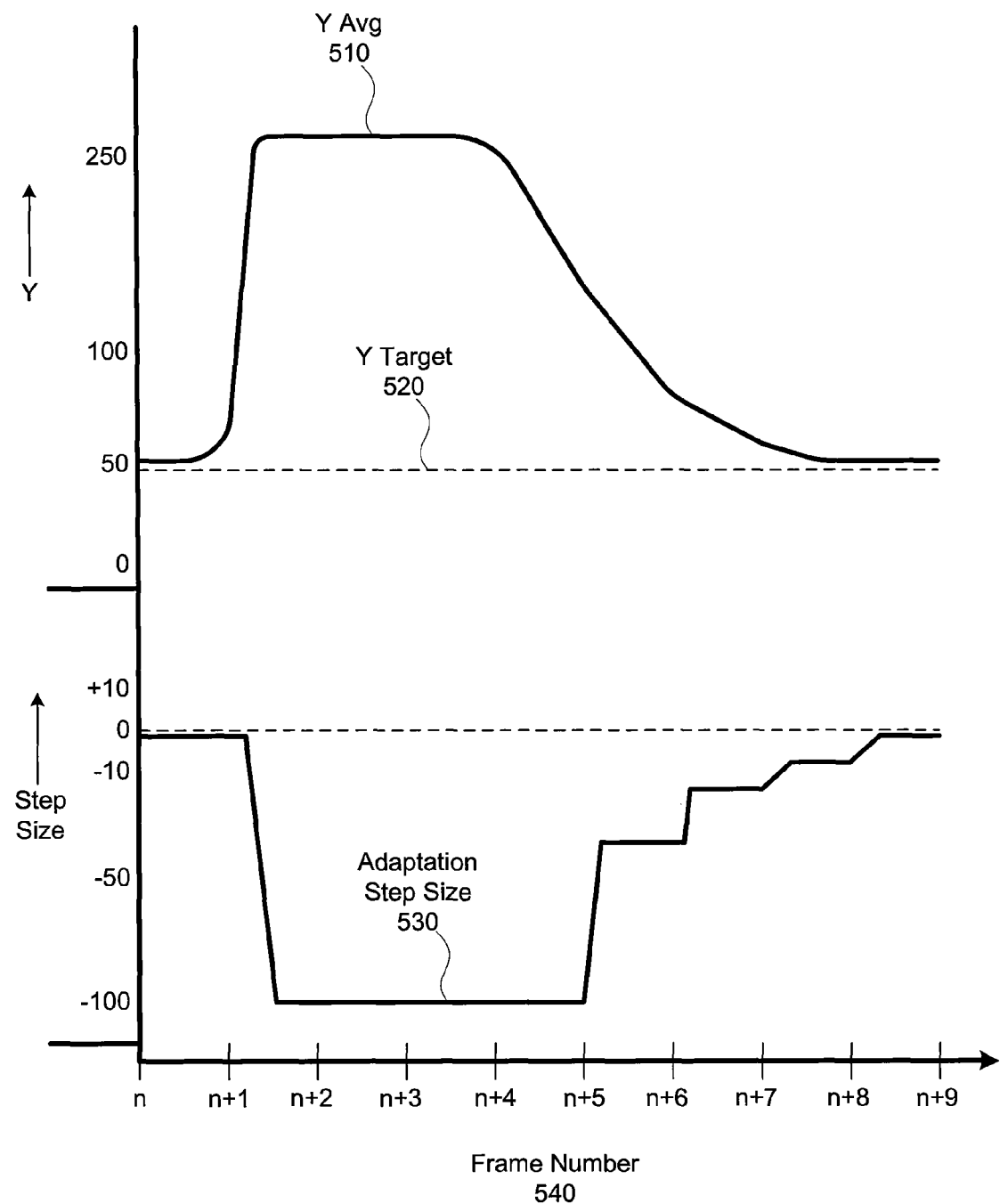
FIG. 5 illustrates average image luma value 510 versus corresponding adaptation step sizes 530 in response to a quick transition from dark to light scene illumination, according to one embodiment of the invention.

FIG. 5 illustrates average image luma value 510 versus corresponding adaptation step sizes 530 in response to a quick transition from dark to light scene illumination, according to one embodiment of the invention. A frame number 540 is shown along a horizontal axis, while luma and step size form vertical axes. Between frame n+1 and frame n+2, the DVC is subjected to a quick transition from dark to a light scene illumination. Because the system gain is set to a higher value to sample the darker scene prior to the quick transition to a bright scene, the average image luma value 510 indicates overexposure in frame n+2. In response, the AEC 230 adapts the system gain to the brighter scene through a series of adaptation steps. The adaptation step sizes 530 are initially large negative values, which are incrementally added to the system gain to reduce the average image luma value 510. After a set of large negative adaptation steps, the average image luma value 510 begins to diminish in sequential frames towards a luma target value 520. Concurrently, the adaptation step size 530 of each frame also diminishes towards a value of zero, which corresponds to a stable system gain and stable scene illumination. Each adaptation step size 530 is computed as a function of the difference between the average image luma value 510 and a luma target value 520. Persons skilled in the art will recognize that functions other than a strict average function may also be used to determine an image luma value, and in no way does the reference to an average value herein limit the scope of this invention.

Figure 6:
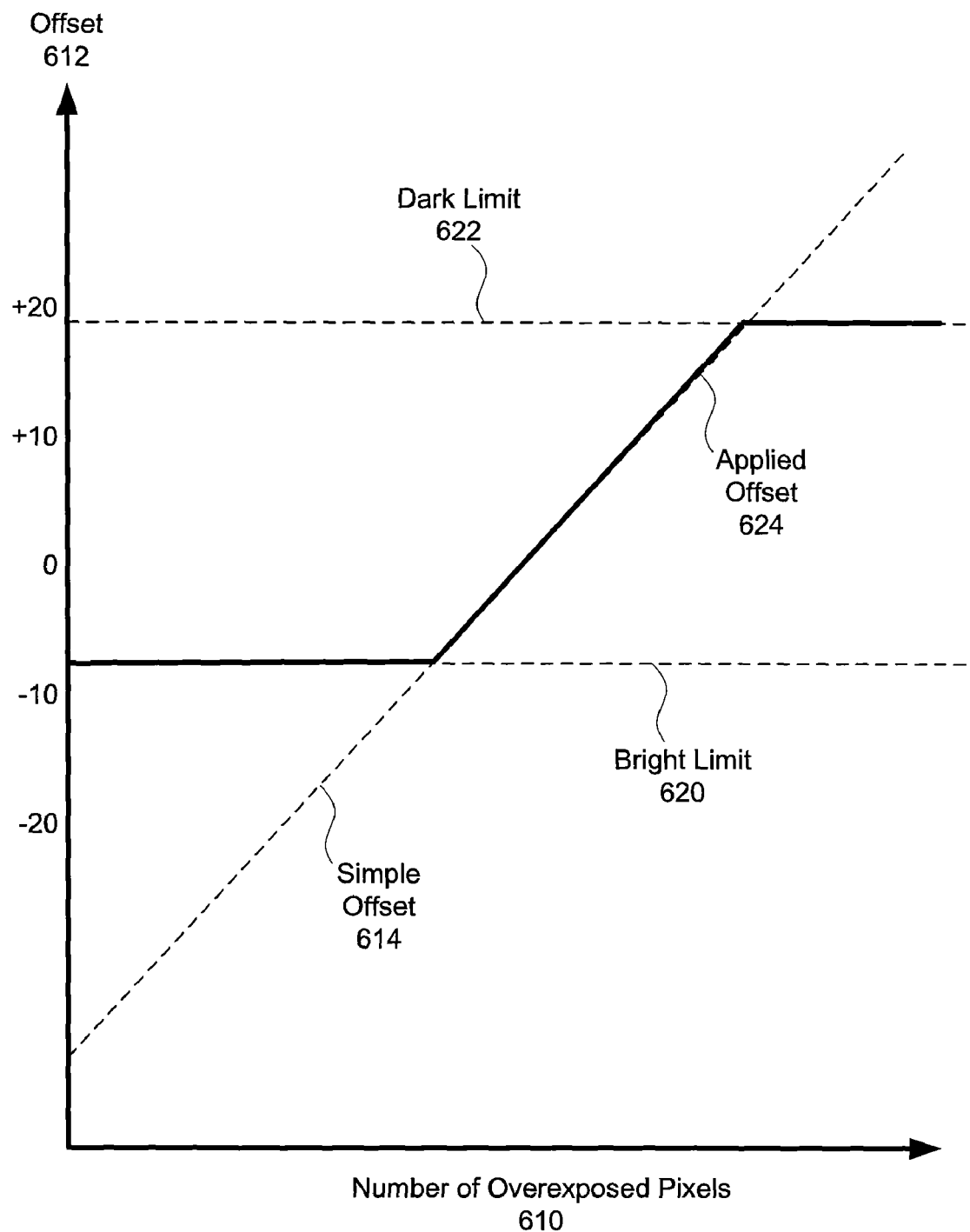
FIG. 6 illustrates a bright limit and dark limit used to compute an applied offset from a simple offset, according to one embodiment of the invention.

FIG. 6 illustrates a bright limit 620 and dark limit 622 used to compute an applied offset 624 from a simple offset 614, according to one embodiment of the invention. A simple offset 614 may be computed to correspond to a number of overexposed pixels 610. In one embodiment, the relationship between the number of exposed pixels 610 and the simple offset 614 is linear. If the simple offset 614 is less than a bright limit 620, then the applied offset 624 is set to the bright limit 620. If, however, the simple offset 614 is greater than the dark limit 622, then the applied offset 624 is set to the dark limit. Between the dark limit 622 and bright limit 620, the applied offset 624 may be set to the simple offset 614. Persons skilled in the art will recognize that adding the applied offset 624 to an image luma value will serve to compensate the image luma value for overexposed pixels for the purpose of adjusting gain within the DVS.

In sum, a method for automatic exposure control within a video capture system is disclosed. The method involves sampling image statistics and determining whether an adaptation step should occur, deriving a target system gain, calculating a delta correction value that is used to compute an adaptation step, computing a new system gain, and establishing a new system gain. The system gain includes three components, specifically exposure gain, analog gain, and digital gain. In apportioning system gain over the three sources of gain, priority is given first to exposure gain, second to analog gain, and third to digital gain. Importantly, the digital gain may be computed for a current frame to bring the image luma value of the current frame closer to the new system gain. The adaptation characteristics of this method may be beneficially tuned to simulate a mechanical iris mechanism, including smooth transitions between light and dark scenes.

One advantage of the methods described herein is that the methods enable inexpensive DVC system hardware to produce higher quality video results, specifically with regard to transitions between high and low environmental illumination.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for computing image statistics associated with a current video frame for controlling changes in recorded image intensity, the method comprising:
    computing an average luma value for the current video frame;
    computing a luma histogram based on luma data associated with the current video frame;
    determining a number of overexposed pixels associated with the current video frame based on the luma histogram;
    computing an offset value based on the number of overexposed pixels; and
    computing a final luma value for the current video frame based on the average luma value for the current video frame and the offset value, wherein the final luma value is used in determining a system gain in a digital video recorder to control the changes in the recorded image intensity.

2. The method of claim 1, wherein the offset value is linearly related to the number of overexposed pixels.

3. The method of claim 1, wherein the step of determining the number of overexposed pixels comprises performing an occurrence count of overexposed pixels in the luma histogram.

4. The method of claim 1, wherein the step of computing the final luma value comprises determining that the offset value is greater than a dark limit, and adding the dark limit to the average luma value for the current video frame to produce the final luma value.

5. The method of claim 1, wherein the step of computing the final luma value comprises determining that the offset value is less than a bright limit, and adding the bright limit to the average luma value for the current video frame to produce the final luma value.

6. The method of claim 1, wherein the step of computing the final luma value comprises determining that the offset value is less than or equal to a dark limit, determining that the offset value is greater than or equal to a bright limit, and adding the offset value to the average luma value for the current video frame to produce the final luma value.

7. A computer readable medium including instructions that, when executed by a processing unit, cause the processing unit to compute image statistics associated with a current video frame for controlling changes in recorded image intensity for the current video frame, by performing the steps of:
    computing an average luma value for the current video frame;
    computing a luma histogram based on luma data associated with the current video frame;
    determining a number of overexposed pixels associated with the current video frame based on the luma histogram;
    computing an offset value based on the number of overexposed pixels; and
    computing a final luma value for the current video frame based on the average luma value for the current video frame and the offset value, wherein the final luma value is used in determining a system gain in a digital video recorder to control the changes in recorded image intensity.

8. The computer readable medium of claim 7, wherein the offset value is linearly related to the number of overexposed pixels.

9. The computer readable medium of claim 7, wherein the step of determining the number of overexposed pixels comprises performing an occurrence count of overexposed pixels in the luma histogram.

10. The computer readable medium of claim 7, wherein the step of computing the final luma value comprises determining that the offset value is greater than a dark limit, and adding the dark limit to the average luma value for the current video frame to produce the final luma value.

11. The computer readable medium of claim 7, wherein the step of computing the final luma value comprises determining that the offset value is less than a bright limit, and adding the bright limit to the average luma value for the current video frame to produce the final luma value.

12. The computer readable medium of claim 7, wherein the step of computing the final luma value comprises determining that the offset value is less than or equal to a dark limit, determining that the offset value is greater than or equal to a bright limit, and adding the offset value to the average luma value for the current video frame to produce the final luma value.

* * * * *